United States Patent
Chatterjee et al.

(10) Patent No.: US 10,089,591 B2
(45) Date of Patent: Oct. 2, 2018

(54) COMPUTER ASSISTED CLASSIFICATION OF PACKAGED APPLICATION OBJECTS AND ASSOCIATED CUSTOMIZATIONS INTO A BUSINESS PROCESS HIERARCHY

(71) Applicant: International Business Machines Corporation, Armonk, NY (US)

(72) Inventors: Biswaroop Chatterjee, Kolkata (IN); Pankaj Dhoolia, Uttar Pradesh (IN); Anjan Nandy, Kolkata (IN); Diptikalyan Saha, Bangalore (IN); Ramesh Babu Tirukoti, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 1372 days.

(21) Appl. No.: 13/909,559

(22) Filed: Jun. 4, 2013

(65) Prior Publication Data
US 2014/0358820 A1   Dec. 4, 2014

(51) Int. Cl.
G06Q 10/06 (2012.01)

(52) U.S. Cl.
CPC .................. G06Q 10/067 (2013.01)

(58) Field of Classification Search
CPC .................................................. G06Q 10/067
USPC ........................................................ 705/348
See application file for complete search history.

(56) References Cited

U.S. PATENT DOCUMENTS

| | | |
|---|---|---|
| 2004/0111284 A1 | 6/2004 | Uijttenbrock |
| 2009/0228512 A1 | 9/2009 | Chopra et al. |
| 2010/0070753 A1* | 3/2010 | Kido ............... G06Q 10/06 713/150 |
| 2011/0078667 A1 | 3/2011 | Dolby et al. |
| 2012/0005647 A1* | 1/2012 | Dolby ................ G06F 8/75 717/105 |
| 2012/0192187 A1* | 7/2012 | Mills .................. G06F 9/46 718/101 |
| 2012/0197681 A1* | 8/2012 | Marrelli ........... G06Q 10/0633 705/7.27 |

OTHER PUBLICATIONS

Intellicorp, Inc, Determining an SAP Upgrade Strategy and Using Technology at Each Stage to Reduce Risk, Cost and Effort, Technical Bulletin, 2012, 14 pages, Santa Clara, California, USA.

* cited by examiner

*Primary Examiner* — Maria C Santos-Diaz
(74) *Attorney, Agent, or Firm* — Ference & Associates LLC (57) ABSTRACT

Methods and arrangements for providing classification for a business process hierarchy. Packaged application objects are received, comprising at least one of the standard application objects and custom objects. At least one of the standard application objects is mapped to at least one node of a business process hierarchy, thereby forming at least one mapping template. At least one of the standard application objects is mapped to at least one of the custom objects to create a first mapping, and at least one of the custom objects is mapped to at least one of the standard application objects to create a second mapping. The at least one mapping template, the first mapping and the second mapping are combined, to create a mapping of at least one of the custom objects to the business process hierarchy. Other variants and embodiments are broadly contemplated herein.

17 Claims, 7 Drawing Sheets

COMPUTER ASSISTED CLASSIFICATION OF PACKAGED APPLICATION OBJECTS AND ASSOCIATED CUSTOMIZATIONS INTO A BUSINESS PROCESS HIERARCHY

BACKGROUND

Generally, packaged application vendors in the domain of Enterprise Resource Planning (ERP) are getting more involved in "business process oriented software and services offerings". From the point of view of the business enterprises that use these ERP packages, a Business Process Hierarchy (BPH) provides an organized view of their IT (information technology) applications and components, to then offer a conceptual bridge between their business and IT.

Most business enterprises that use commercially available ERP packages have undertaken numerous customizations with respect to older versions of their packaged applications. In scenarios such as system consolidation or upgrade, it is often desired to organize these customizations, or custom objects, in accordance with a BPH, and then use the resulting organized information to size, plan and implement the consolidation or upgrade.

Generally, organizing custom objects into a BPH is not a trivial task, and practitioners expend a significant degree of manual effort in organizing custom objects using the BPH. Such manual effort tends to present undesirable inefficiencies that tend to defeat the purpose of the objective nature of the associated structures.

BRIEF SUMMARY

In summary, one aspect of the invention provides a method of providing classification for a business process hierarchy, the method comprising: utilizing at least one processor to execute computer code configured to: receive packaged application objects comprising standard application objects and custom objects; map at least one of the standard application objects to at least one node of a business process hierarchy, thereby forming at least one mapping template; map at least one of the standard application objects to at least one of the custom objects to create a first mapping; map at least one of the custom objects to at least one of the standard application objects to create a second mapping; and combine the at least one mapping template, the first mapping and the second mapping, to create a mapping of custom objects to the business process hierarchy.

Another aspect of the invention provides an apparatus for providing classification for a business process hierarchy, the apparatus comprising: at least one processor; and a computer readable storage medium having computer readable program code embodied therewith and executable by the at least one processor, the computer readable program code comprising: computer readable program code configured to receive packaged application objects comprising at least one of the standard application objects and custom objects; computer readable program code configured to map at least one of the standard application objects to at least one node of a business process hierarchy, thereby forming at least one mapping template; computer readable program code configured to map at least one of the standard application objects to at least one of the custom objects to create a first mapping; computer readable program code configured to map at least one of the custom objects to at least one of the standard application objects to create a second mapping; and computer readable program code configured to combine the at least one mapping template, the first mapping and the second mapping, to create a mapping of at least one of the custom objects to the business process hierarchy.

An additional aspect of the invention provides a computer program product for providing classification for a business process hierarchy, the computer program product comprising: a computer readable storage medium having computer readable program code embodied therewith, the computer readable program code comprising: computer readable program code configured to receive packaged application objects comprising at least one of the standard application objects and custom objects; computer readable program code configured to map at least one of the standard application objects to at least one node of a business process hierarchy, thereby forming at least one mapping template; computer readable program code configured to map at least one of the standard application objects to at least one of the custom objects to create a first mapping; computer readable program code configured to map at least one of the custom objects to at least one of the standard application objects to create a second mapping; and computer readable program code configured to combine the at least one mapping template, the first mapping and the second mapping, to create a mapping of at least one of the custom objects to the business process hierarchy.

A further aspect of the invention provides a method comprising: (a) mapping standard application objects to nodes of a business process hierarchy; (b) mapping standard application objects, in a top-down manner, to custom objects associated with the standard application objects; (c) mapping remaining custom objects, in a bottom-up manner, to standard application objects; and (d) propagating mappings from the steps (a), (b) and (c) to the business process hierarchy via finding standard application objects in a dependency graph of driver objects that have been mapped to the business process hierarchy.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 7. In accordance with an example embodiment, most if not all of the process steps, components and outputs discussed with respect to FIGS. 1-5 can be performed or utilized by way of a processing unit or units and system memory such as those indicated, respectively, at 16' and 28' in FIG. 7, whether on a server computer, a client computer, a node computer in a distributed network, or any combination thereof.

Broadly contemplated herein, in accordance with at least one embodiment of the invention, are methods and arrangements which effect a mapping, to a BPH, of all customizations done to an ERP system. As such, broadly contemplated herein are methods and arrangements for creating a one-time mapping template that links the BPH nodes to the corresponding driver programs in the packaged application hierarchy.

In accordance with at least one embodiment of the invention, in a top-down manner, the driver programs are associated to the customizations. An inter-procedural dependency graph is calculated, starting at the driver programs. In a bottom-up manner, the customizations are associated to driver programs using various heuristic measures such as: [uses/used-by], application-component-of-the-customization-package, structure of the output. ([uses/used-by] is employed for various applicable types of objects such as programs, tables, data-dictionary types, etc.). Respective weights for these associations are computed by determining the impact and the criticality of each association in the functioning of the customization via computing static slices corresponding to these associations, and comparing the size and nature (e.g., critical or forgiving) of these associations.

Figure 1:
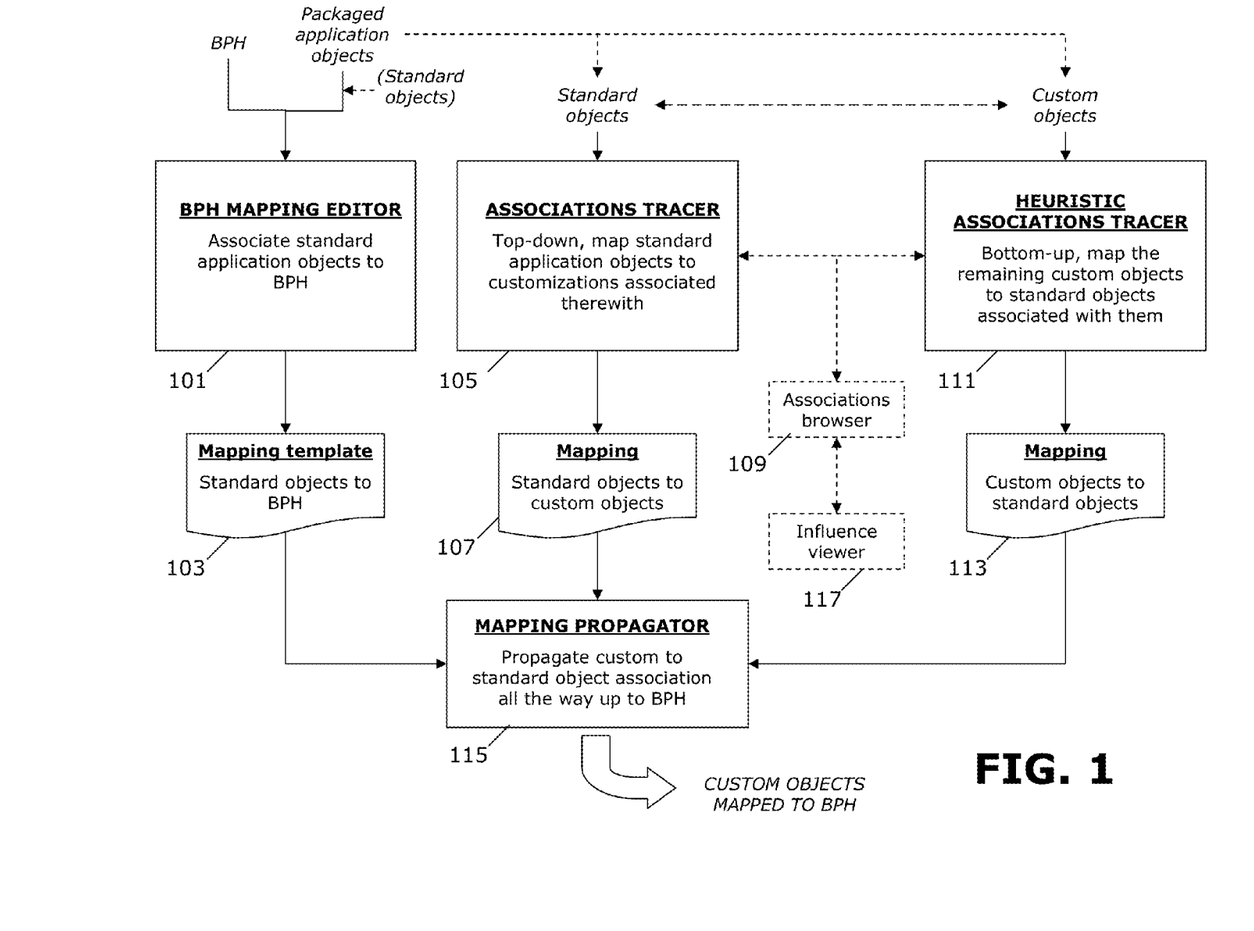
FIG. 1 schematically illustrates a general system diagram and process flow.

FIG. 1 schematically illustrates a general system diagram and process flow, in accordance with at least one embodiment of the invention. A BPH mapping editor 101 loads a BPH, and visualizes it. It assists in mapping BPH nodes to standard application objects, that is, transactions in the packaged application and related driver programs, or to one or more other specified standard programs. ("Standard application objects", or ["standard objects"], as well as "custom objects" [or "customizations"], respectively form subsets of "packaged application objects" initially associated with a packaged application.) It further generates the dependency graph for the mapped program. Then, it saves the mappings as mapping templates (103), that may be later loaded, edited, visualized and saved. These then become "base" templates onto which are overlaid mappings of standard objects to custom objects, and vice versa (items 107 and 113, discussed more fully below).

In accordance with at least one embodiment of the invention, a "birds of a feather associations tracer" 105, for any given standard object, traces the chain of inheritance, and extends to find any custom objects in it, thereupon outputting a mapping of standard objects to custom objects (107). The custom objects present in such chains, "birds of a feather", may be associated to the same BPH category as the standard object. An object associations browser 109 is used for visualizing these associations. Preferably, "birds of a feather" semantics are employed in rendering associations, such as "inherit/inherited by" and "extend/extended-by".

In accordance with at least one embodiment of the invention, a heuristic associations tracer 111, for any given program, acts bottom-up to extract associations of remaining custom objects with various standard objects. For each association, it computes the influence of that standard object with respect to forward data dependence, forward data and control-dependence, and the contribution to the output; its output (113) thus becomes a mapping of custom objects to standard objects. The object associations browser 109 is also used here for visualizing such associations. Here, heuristics may be employed such as: "use/used-by" and the relative impact they exercise over custom objects; a relative contribution of standard objects to the output 113 (see below); and packaging and its association with an application component.

More particularly, in accordance with at least one embodiment of the invention, heuristic associations tracer 111 acts such that a custom "program" object comes to be associated with some standard objects (e.g., programs, tables, structures). The custom program object produces output 113 (as referred to above). As such, and as broadly contemplated herein, there is tracking of the roles that the employed standard objects are assuming in the production of the output. For instance, if the custom program reads from a standard table and then writes out a part of that table to the screen, then that table is playing a role in the custom program's output. The custom program may be reading another table as well. However, if, e.g., no content from that table is being used (directly or indirectly) by the custom program in the output that it is writing to the screen or a table or a file, then such a standard table cannot really be indicated as being associated with the custom program's output.

Additionally, in accordance with at least one embodiment of the invention, it will be appreciated that three heuristics are considered for use in associating a custom program object with standard objects. These three heuristics are: use/used-by; contributions of any standard objects to the custom program's output; and a package (logical container) with which the custom object has been associated, and the associations of that package with other standard objects. With particular regard to the package and its associations, if the custom object to be associated with other standard objects cannot be so associated directly, then a determination is made as to whether its package/container has some strong associations with some standard objects. Thus, an attempt is made to associate the package with any standard application component, whereupon if the package of the custom object is indeed noted as being strongly associated with some standard component(s), then the custom object can also be understood to be related to the same standard component(s).

In accordance with at least one embodiment of the invention, a mapping propagator 115 acts to receive input in the form of mapping template 103, and mappings 107/113, to propagate a custom-to-standard object association all the way up to the BPH. Particularly, mappings traced between standard and custom objects are propagated to the BPH by finding the associated standard objects in a dependency graph of driver (program) objects mapped to the BPH. Also, an influence viewer 117, for a given association, visually illustrates the influence of the association on the object. It annotates the influences as output, data, and control-and-data. It provides easy forward/backward navigation through the influence slice, and provides a mechanism to get back to the association view.

Figure 2:
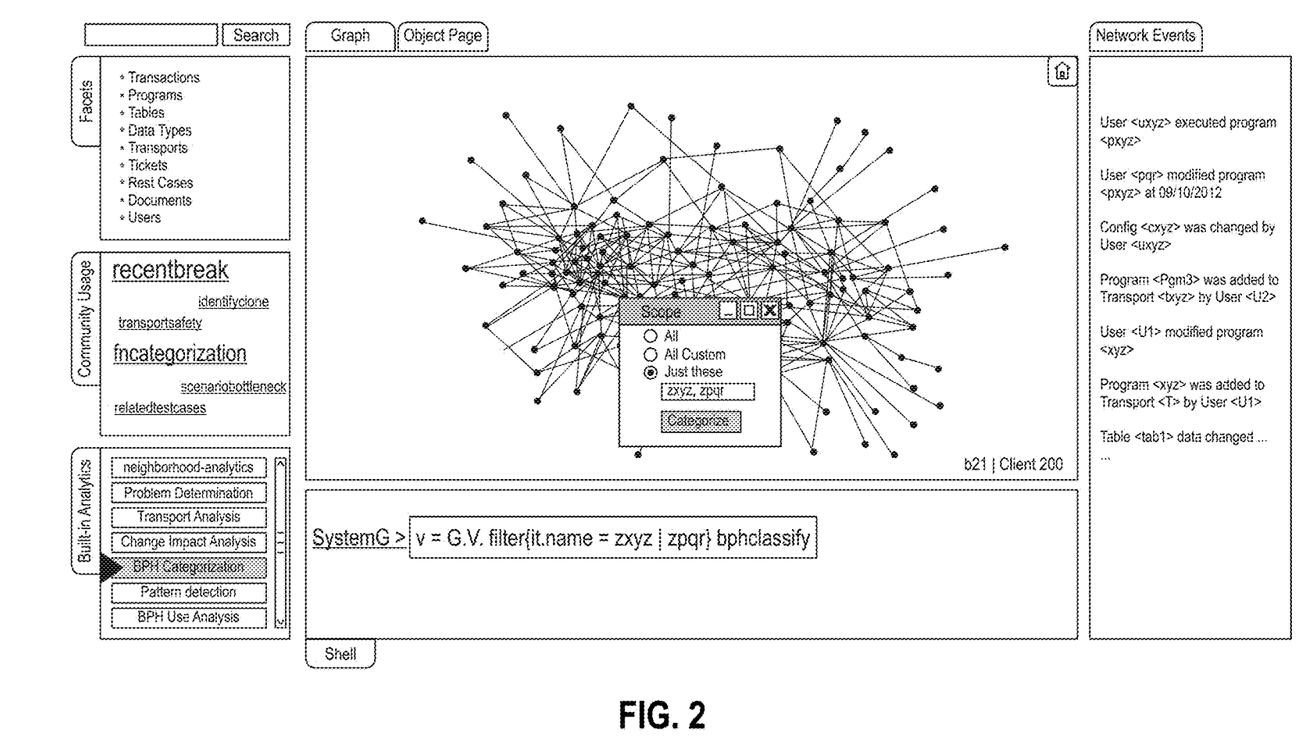
FIGS. 2-5 depict several screenshot views.
Figure 3:
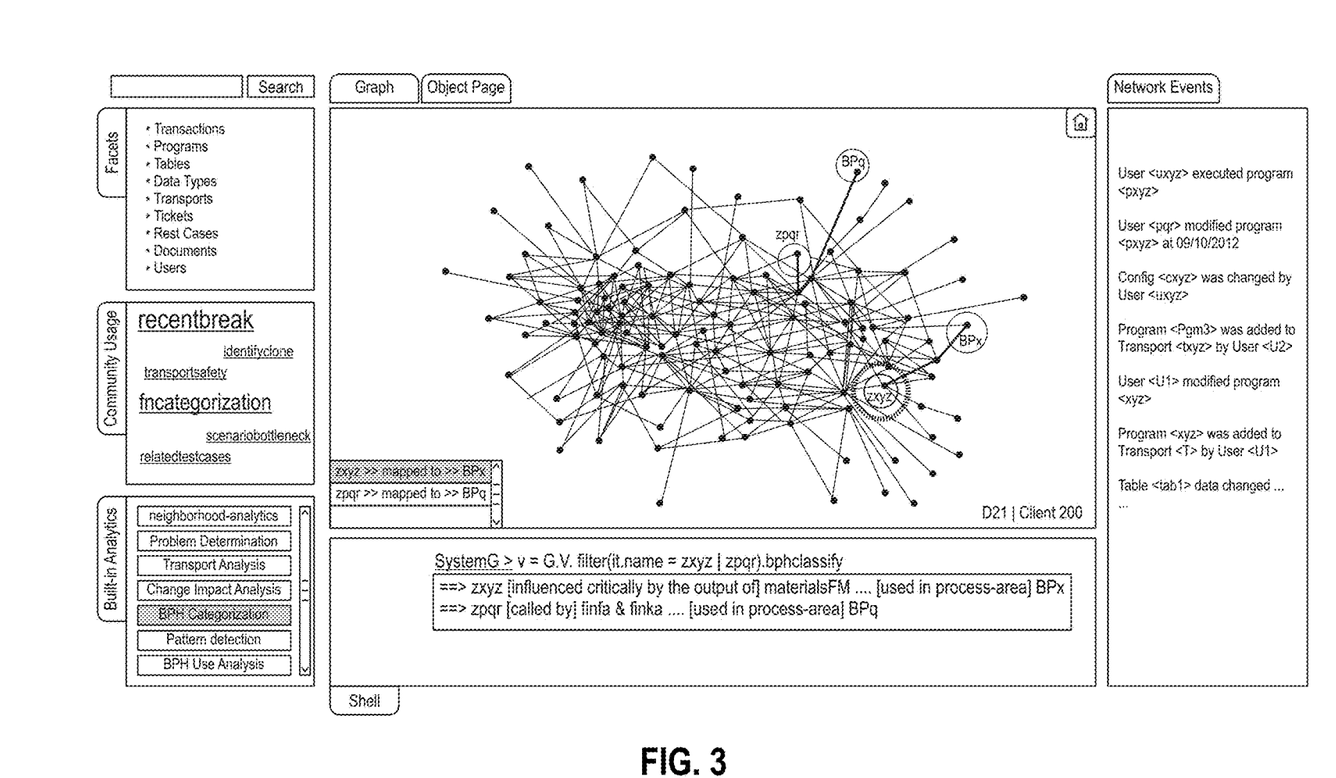

FIGS. 2-5 depict several screenshot views in accordance with at least one embodiment of the invention. FIG. 2 depicts a start screen for BPH categorization. FIG. 3 depicts a screen in "response" mode or, more particularly, acting in a capacity as an associations tracer (105 in FIG. 1) as discussed herein.

Figure 4:
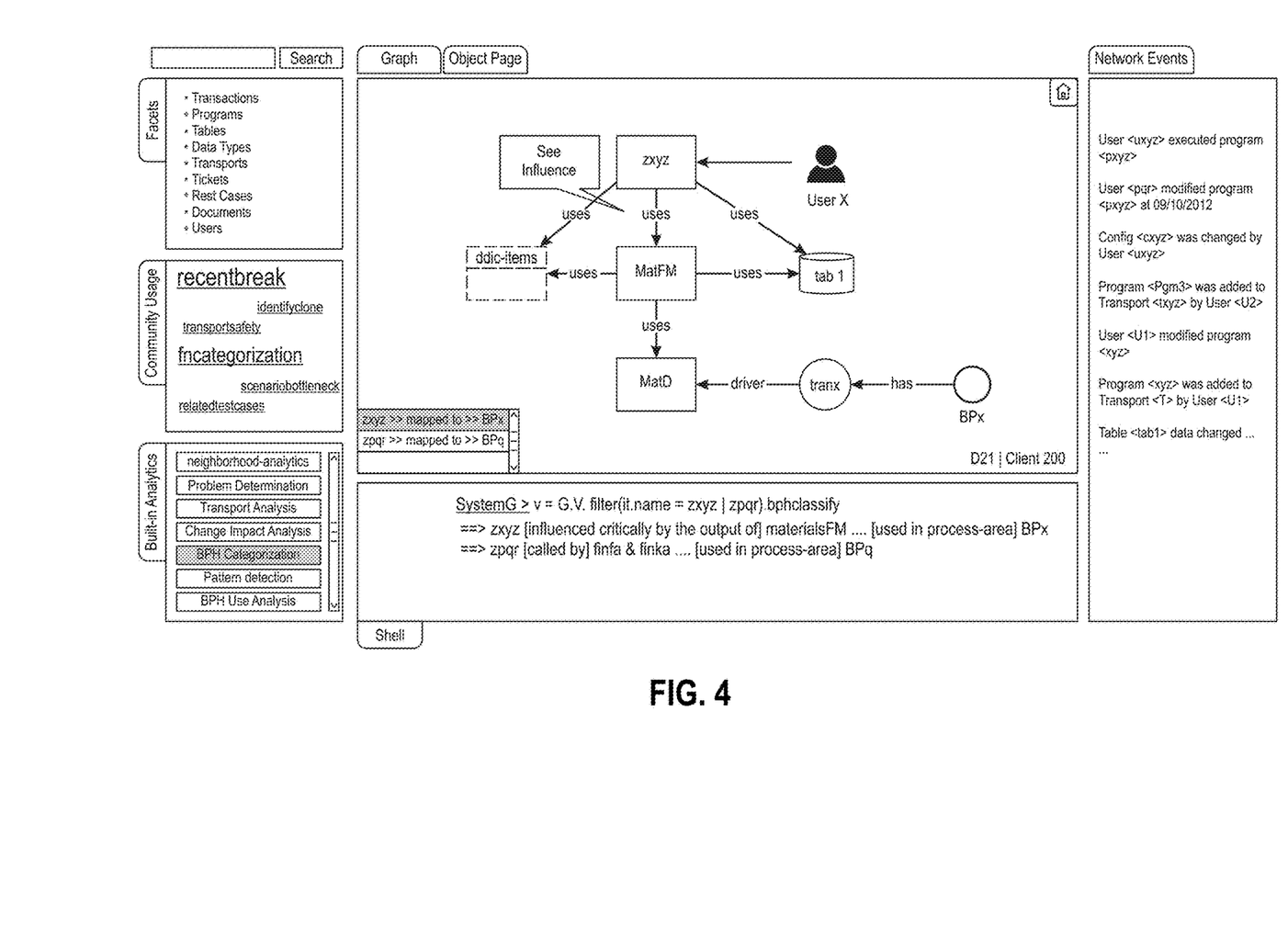
Figure 5:
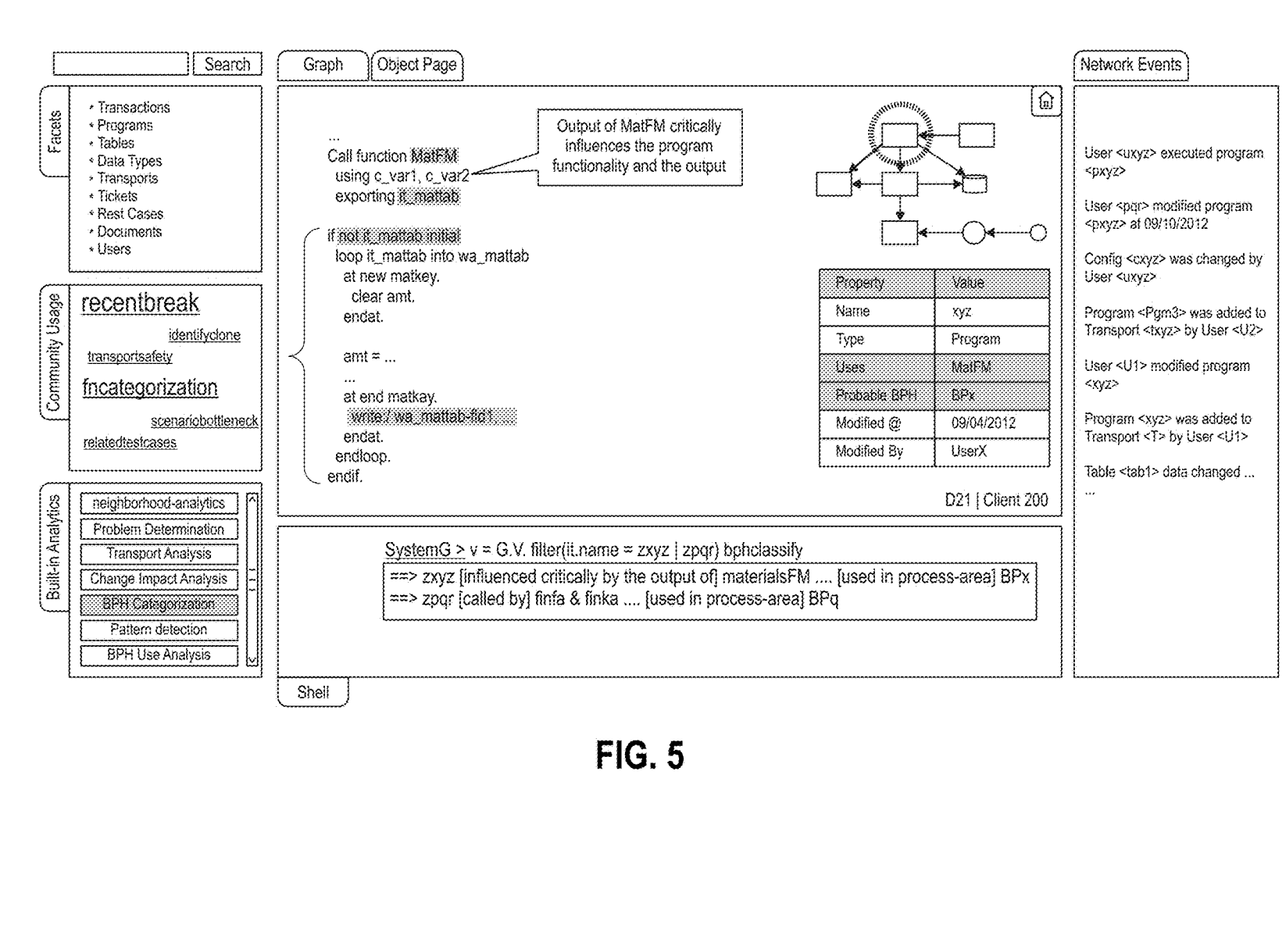

In accordance with at least one embodiment of the invention, FIG. 4 depicts a screen in "zoom in" mode or, more particularly, acting in a capacity as an influence viewer (117 in FIG. 1) as discussed herein. Finally, FIG. 5 depicts a screen in "detail exploration" mode or, more particularly, acting in a capacity to view the details of the influence (and its criticality) that a particular standard object exerts on the processing and output of a custom object, as discussed hereabove.

Figure 6:
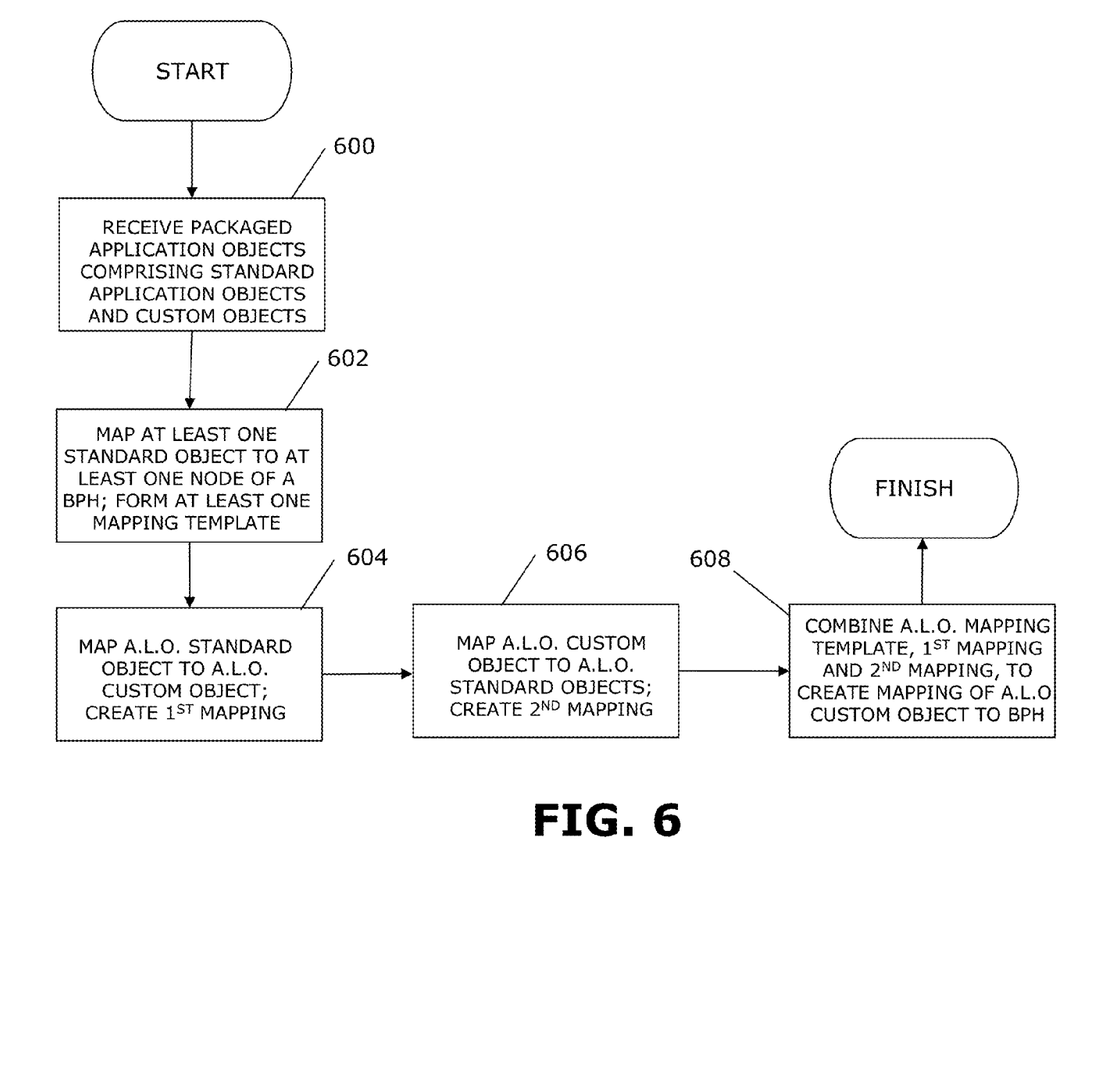
FIG. 6 sets forth a process more generally for providing classification for a business process hierarchy.

FIG. 6 sets forth a process more generally for providing classification for a business process hierarchy, in accordance with at least one embodiment of the invention. It should be appreciated that a process such as that broadly illustrated in FIG. 6 can be carried out on essentially any suitable computer system or set of computer systems, which may, by way of an illustrative and non-restrictive example, include a system such as that indicated at 12' in FIG. 7. In accordance with an example embodiment, most if not all of the process steps discussed with respect to FIG. 6 can be performed by way of a processing unit or units and system memory such as those indicated, respectively, at 16' and 28' in FIG. 7.

As shown in FIG. 6, in accordance with at least one embodiment of the invention, packaged application objects are received, comprising at least one of the standard application objects and custom objects (600). At least one of the standard application objects is mapped to at least one node of a business process hierarchy, thereby forming at least one mapping template (602). At least one of the standard application objects is mapped to at least one of the custom objects to create a first mapping (604), and at least one of the custom objects is mapped to at least one of the standard application objects to create a second mapping (606). The at least one mapping template, the first mapping and the second mapping are combined, to create a mapping of at least one of the custom objects to the business process hierarchy (608).

Figure 7:
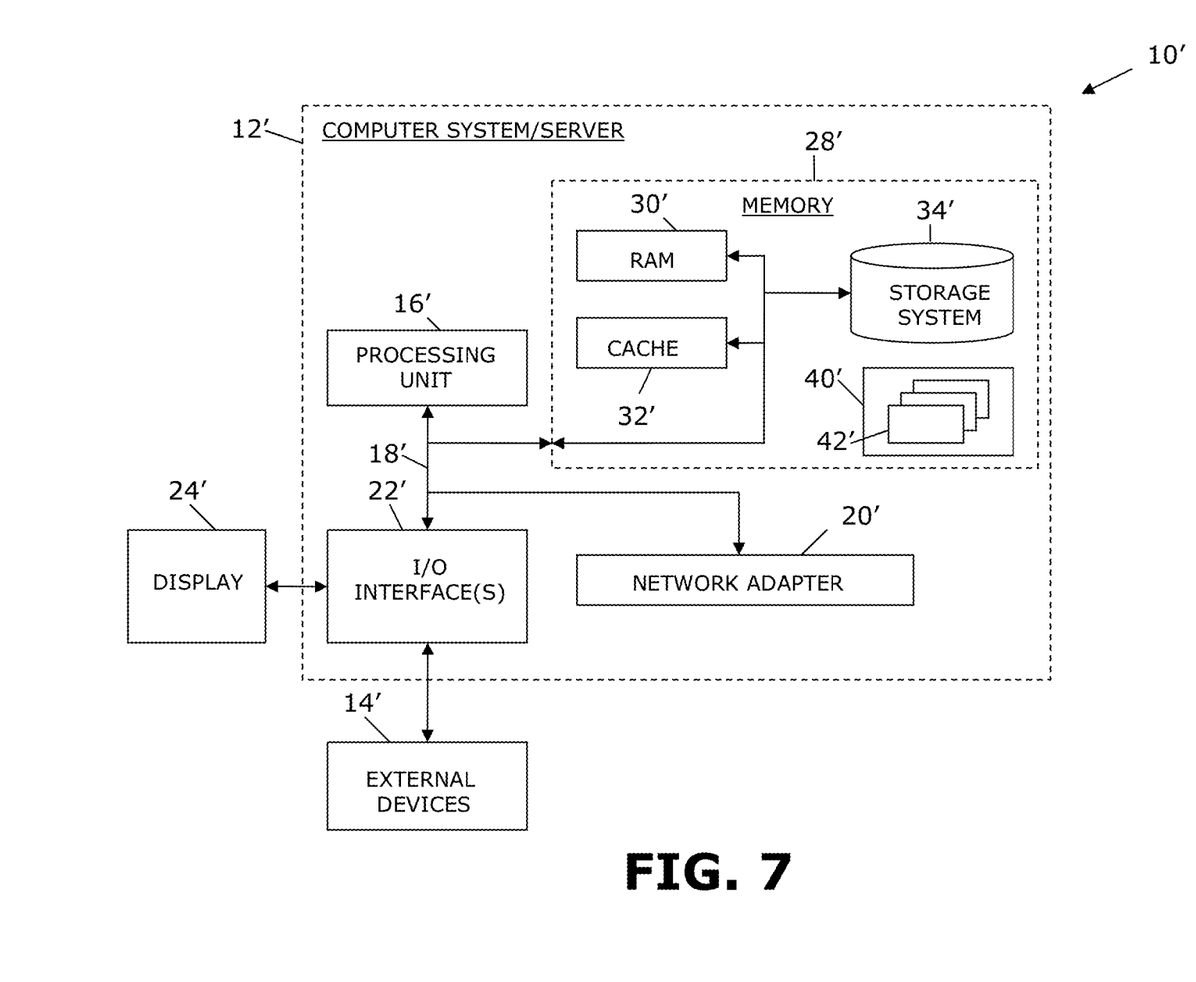
FIG. 7 illustrates a computer system.

Referring now to FIG. 7, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of providing classification for a business process hierarchy, said method comprising:
utilizing at least one processor to execute computer code configured to:
receive packaged application objects comprising standard application objects and custom objects each having a corresponding driver program;
receive a business process hierarchy comprising nodes, each node representing a business process having an associated application;
map at least one of the standard application objects to at least one node of the business process hierarchy, thereby forming at least one mapping template, wherein each of the standard application objects are associated with a business process hierarchy category;
map at least one of the standard application objects to at least one of the custom objects to create a first mapping and associating the at least one of the custom objects to the business process hierarchy category associated with the corresponding standard application object;
for the custom objects remaining after mapping the at least one of the standard application objects to the at least one of the custom objects, map, using at least one heuristic, at least one of the remaining custom objects to at least one of the standard application objects to create a second mapping;
combine the at least one mapping template, the first mapping and the second mapping, to create a mapping of custom objects to the business process hierarchy; and
identify a driver program for each node of the business process hierarchy based upon the mapping of the standard application objects and the mapping of custom objects.

2. The method according to claim 1, wherein mapping at least one of the standard application objects to at least one of the custom objects comprises using at least one semantic.

3. The method according to claim 2, wherein the at least one semantic comprises at least one of: inheritance and extension.

4. The method according to claim 1, wherein mapping at least one of the custom objects to at least one of the standard application objects comprises using at least one association.

5. The method according to claim 4, wherein the at least one association comprises at least one general association selected from the group consisting of: use/used-by, called/called-by, and include/included-by.

6. The method according to claim 1, wherein combining comprises finding standard objects of the mappings in a dependency graph of driver objects mapped to the business process hierarchy.

7. The method according to claim 1, comprising utilizing at least one processor to execute computer code configured to provide an arrangement for exploring and viewing associations between at least one of the standard application objects and at least one of the custom objects.

8. The method according to claim 1, comprising utilizing at least one processor to execute computer code configured to provide an arrangement for viewing an influence of at least one association with respect to an object.

9. An apparatus for providing classification for a business process hierarchy, said apparatus comprising:
at least one processor; and
a computer readable storage medium having computer readable program code embodied therewith and executable by the at least one processor, the computer readable program code comprising:
computer readable program code configured to receive packaged application objects comprising at least one of the standard application objects and custom objects each having a corresponding driver program;
computer readable program code configured to receive a business process hierarchy comprising nodes, each node representing a business process having an associated application;
computer readable program code configured to map at least one of the standard application objects to at least one node of the business process hierarchy, thereby forming at least one mapping template, wherein each of the standard application objects are associated with a business process hierarchy category;
computer readable program code configured to map at least one of the standard application objects to at least one of the custom objects to create a first mapping and associate the at least one of the custom objects to the business process hierarchy category associated with the corresponding standard application object;
computer readable program code configured to, for the custom objects remaining after mapping the at least one of the standard application objects to the at least one of the custom objects, map, using at least one heuristic, at least one of the remaining custom objects to at least one of the standard application objects to create a second mapping;
computer readable program code configured to combine the at least one mapping template, the first mapping and the second mapping, to create a mapping of at least one of the custom objects to the business process hierarchy; and computer readable program code configured to identify a driver program for each node of the business process hierarchy based upon the mapping of the standard application objects and the mapping of custom objects.

10. A computer program product for providing classification for a business process hierarchy, said computer program product comprising:

a non-transitory computer readable storage medium having computer readable program code embodied therewith, the computer readable program code comprising:

computer readable program code configured to receive packaged application objects comprising at least one of the standard application objects and custom objects each having a corresponding driver program;

computer readable program code configured to receive a business process hierarchy comprising nodes, each node representing a business process having an associated application;

computer readable program code configured to map at least one of the standard application objects to at least one node of the business process hierarchy, thereby forming at least one mapping template, wherein each of the standard application objects are associated with a business process hierarchy category;

computer readable program code configured to map at least one of the standard application objects to at least one of the custom objects to create a first mapping and associate the at least one of the custom objects to the business process hierarchy category associated with the corresponding standard application object;

computer readable program code configured to, for the custom objects remaining after mapping the at least one of the standard application objects to the at least one of the custom objects, map, using at least one heuristic, at least one of the remaining custom objects to at least one of the standard application objects to create a second mapping;

computer readable program code configured to combine the at least one mapping template, the first mapping and the second mapping, to create a mapping of at least one of the custom objects to the business process hierarchy; and computer readable program code configured to identify a driver program for each node of the business process hierarchy based upon the mapping of the standard application objects and the mapping of custom objects.

11. The computer program product according to claim 9, wherein said computer readable program code is configured to map at least one of the standard application objects to at least one of the custom objects via using at least one semantic.

12. The computer program product according to claim 9, wherein the at least one semantic comprises at least one of: inheritance and extension.

13. The computer program product according to claim 9, wherein said computer readable program code is configured to map at least one of the custom objects to at least one of the standard application objects via using at least one association.

14. The computer program product according to claim 9, wherein the at least one association comprises at least one general association selected from the group consisting of: use/used-by, called/called-by, and include/included-by.

15. The computer program product according to claim 9, wherein said computer readable program code is configured to find standard objects of the mappings in a dependency graph of driver objects mapped to the business process hierarchy.

16. The computer program product according to claim 9, wherein said computer readable program code is configured to provide an arrangement for exploring and viewing associations between at least one of the standard application objects and at least one of the custom objects.

17. The computer program product according to claim 9, wherein said computer readable program code is configured to provide an arrangement for viewing an influence of at least one association with respect to an object.

* * * * *